United States Patent [19]

Lew

[11] Patent Number: 5,275,067
[45] Date of Patent: Jan. 4, 1994

[54] FRONT FORK AND HANDLE BAR UNIT FOR A BICYCLE

[76] Inventor: Paul E. Lew, 2702 Fairview La., Muncie, Ind. 47304

[21] Appl. No.: 979,380

[22] Filed: Nov. 19, 1992

Related U.S. Application Data

[63] Continuation of Ser. No. 700,593, May 15, 1991, abandoned.

[51] Int. Cl.$^5$ .................... B62K 21/12; B62J 17/00
[52] U.S. Cl. .................... 74/551.1; 74/551.8; 74/551.3; 280/279; 280/281.1; 280/288.4; 296/78.1; D12/111
[58] Field of Search ............... 74/551.1–; 280/288.4, 274–; 296/78.1; D12/111

[56] References Cited

U.S. PATENT DOCUMENTS

| | | |
|---|---|---|
| D. 136,565 | 10/1943 | Snell . |
| D. 138,304 | 7/1944 | Boynton ............ D90/8 |
| 185,401 | 12/1876 | Marble ............ 280/274 |
| 313,381 | 1/1991 | Moeller ............ D12/111 |
| 1,502,838 | 7/1924 | Barber ............ 280/1.13 |
| 1,738,855 | 12/1929 | Thompson ............ 74/551.1 |
| 1,995,795 | 3/1935 | Clark ............ 208/145 |
| 3,605,929 | 9/1971 | Rolland ............ 280/282 |
| 3,891,265 | 6/1975 | Blackburn ............ 296/78.1 |
| 4,066,290 | 1/1978 | Wiegert et al. ............ 296/78.1 |
| 4,111,446 | 9/1978 | Kassai ............ 280/282 |
| 4,323,263 | 4/1982 | Cook et al. ............ 74/551.1 |
| 4,326,728 | 4/1982 | Tatch ............ 280/289 |
| 4,359,231 | 11/1982 | Mulcahy ............ 280/288.1 |
| 4,411,333 | 10/1983 | Bothwell ............ 180/219 |
| 4,423,901 | 1/1984 | Shumard et al. ............ 296/78.1 |
| 4,453,730 | 6/1984 | Klose ............ 280/281.1 |
| 4,634,138 | 1/1987 | Fry et al. ............ 74/551.3 |
| 4,655,497 | 4/1987 | Mallett ............ 296/78.1 |
| 4,790,555 | 12/1988 | Nobile ............ 296/78.1 |
| 4,813,583 | 3/1989 | Carpenter ............ 224/30 R |
| 4,951,525 | 8/1990 | Borromeo ............ 74/551.8 |
| 4,958,842 | 9/1990 | Chang ............ 280/282 |
| 5,000,069 | 3/1991 | Smith ............ 74/551.8 |
| 5,016,895 | 5/1991 | Hollingsworth et al. ............ 280/280 |
| 5,072,961 | 12/1991 | Huppe ............ 280/288.4 |

FOREIGN PATENT DOCUMENTS

| | | | |
|---|---|---|---|
| 0971577 | 4/1902 | France ............ | 296/78.1 |
| 1131612 | 2/1957 | France ............ | 296/78.1 |
| 2549796 | 2/1985 | France ............ | 74/551.8 |

Primary Examiner—Carl D. Friedman
Assistant Examiner—Winnie Yip
Attorney, Agent, or Firm—Woodard, Emhardt, Naughton, Moriarty & McNett

[57] ABSTRACT

An integral front fork and handlebar unit for attachment to the head tube of a bicycle includes a unitary member which is arranged into a handlebar portion for use in steering the bicycle, a front fork portion attaching to the front wheel of the bicycle and a connecting portion for joining together the handlebar portion and the front fork portion. The entire unit has a forward protruding wedge shape and is continuous in nature without any openings or voids with the exception of the front fork which splits into two front wheel support arms disposed on opposite sides of the front bicycle wheel. As part of the unitary and integral construction, a generally cylindrical post is provided on the center line of the unit and this post is received by the head tube of the bicycle in order to provide the rotational pivot for transferring steering forces from the handlebar portion to the front fork portion.

14 Claims, 3 Drawing Sheets

FRONT FORK AND HANDLE BAR UNIT FOR A BICYCLE

This application is a continuation of application Ser. No. 07/700,593, filed May 15, 1991, now abandoned.

BACKGROUND OF THE INVENTION

The present invention relates in general to bicycle construction concepts for the front fork and handlebars. More specifically the present invention relates to an integral front fork and handlebar unit providing greater structural integrity, strength and control.

In typical or conventional bicycle constructions the front wheel fork or yoke includes a pair of oppositely disposed wheel supports which are joined by a cross member and thereby connected to a front fork pivot tube. The pivot tube is received by the head tube of the bicycle frame and the handlebars are attached in order to control the steering of the front wheel. One of the drawbacks with this multipiece, multi-interface construction is its lack of structural integrity and strength. If the various connections are not secure or the desired alignment not exactly correct, the bicycle will not respond and will not be controlled in an optimum fashion.

Another aspect of typical or conventional bicycle construction is the open design of the frame and wheels. The rider is not shielded and while a forward leaning or crouching position may reduce the drag coefficient, the aerodynamics are still very inefficient. In order to improve the aerodynamics of bicycles and to shield the rider from wind, fairings have been designed as an adaptation of windshields and have been extended to cover virtually the entire height of the combined bicycle and rider. Another improvement for the aerodynamics of a bicycle is the disk wheel or the use of a wheel cover.

While fairings have been designed in a variety of styles and configurations, they are not "legal" for cycling competition, such as triathlon competition, when they are attached to the bicycle as a separate component. It would be an improvement to such competition bicycles if the aerodynamics could be improved in a manner that would be considered as legal by the cycling governing bodies. If the improved aerodynamics could be combined with an integral front wheel fork and handlebar unit, a number of advantages can be provided. The novelty of such a proposed design will be appreciated from a review of certain prior references which are listed and discussed below.

In U.S. Pat. No. Des. 313,381 which issued Jan. 1, 1991 to Moeller an ornamental design for a bicycle is disclosed. This ornamental design provides a stylized and sculptured frame and although something similar to a front wheel fork is shown, there is no head tube and no pivot tube. The obvious problem with this design is that there is no means to steer the bicycle, but that is simply one difference from the present invention. Another difference between the present invention and the Moeller design is that the Moeller bicycle is a dedicated design. The front fork and handlebar arrangement is not usable on or adaptable to any other standard bicycle.

The following references are similar in that they each disclose a fairing addition to a two-wheel vehicle, such as a bicycle or motorcycle. The focus of each reference is on the specific design of the add-on fairing and how it attaches to the remaining structure, including the attaching hardware. This group of patent references includes the following:

| Patent No. | Issued | Patentee |
|---|---|---|
| 3,891,265 | June 24, 1975 | Blackburn |
| 4,066,290 | January 3, 1978 | Wiegert |
| 4,813,583 | March 21, 1989 | Carpenter |
| 4,423,901 | January 3, 1984 | Shumard |
| 4,655,497 | April 7, 1987 | Mallett |

Blackburn discloses a windscreen fairing for attachment to the handlebars of a bicycle in order to protect the hands, torso and face of a bicycle rider. The windscreen fairing includes a sheet comprised of a clear, flexible material and a series of slots and holes for receipt of attaching brackets which are in turn attached to the handlebars.

Wiegert discloses a lightweight bicycle fairing which is attachable to the handles of the bicycle by a pair of mounting rods forming a rigid and stable mounting structure and by clamps attaching to the front-wheel fork. The design of the fairing provides a streamlined rounded surface to the front of the bicycle and a relatively large concave enclosure to the rear to cover the upper portions of the bicycle and rider as viewed from the front.

Carpenter discloses a rigid aerodynamic shell in order to increase the aerodynamic shear efficiency of a bicycle laden with luggage bags, luggage racks and/or luggage attached to the luggage racks. The aerodynamic shells substantially frontally surround or enclose the luggage bags, racks and luggage attached above the front and rear wheel of the bicycle. The shells are pivotably connected to the bicycle to provide access to the bags, rack and luggage.

Shumard discloses a motorcycle fairing apparatus having a pair of vertically spaced, transversely extending cross members which mate with the motorcycle frame and support a pair of longitudinally extending side plates having upwardly facing mounting surfaces which mate with complimentary mounting surfaces of a fairing.

Mallett discloses a bicycle fairing for attachment to the handlebars and front wheel of a bicycle. The fairing is constructed of a lower portion having a sheet-over-frame construction and an upper portion having a window therein. The window is comprised of a flexible, resilient pane which is unframed to provide the bicyclist with an unobstructed line of vision.

The fact that the fairings are attached to the bicycle as a separate component means that this type of structure is not "legal" for competition bicycles, such as those used in triathlons. Each of these fairings as disclosed by the listed references could also be modified or reworked such that they could be used on other vehicles. In contrast, the present invention is limited to a bicycle due to the integrated and unitary design of the front wheel fork and handlebars as well as the unitary and integral design of a front fork post in the present invention which is used as the means of attachment to the head tube of the bicycle.

U.S. Pat. No. 1,995,795 which issued Mar. 26, 1935 to Clark discloses a casing for bicycle accessories in order to provide a way of carrying bicycle equipment. The design involves a modification to the front wheel fork but it does not involve any interface with or modification to the handlebars.

Another patent of possible interest with regard to the present invention is U.S. Pat. No. 4,326,728 which issued Apr. 27, 1982 to Tatch. This patent reference discloses an apparatus for enhancing the aerodynamic travel capabilities of a ground-travelling vehicle having a frame. Anchor means are attached to the frame and an aerodynamic fairing surrounds the frame and is attached to the anchor means with biasing means. The biasing means are arranged to create a generally upright vertical pivot axis about which the fairing can pivot within predetermined limits.

U.S. Pat. No. 4,411,333 which issued Oct. 25, 1983 to Bothwell discloses a motorcycle including a frame and a fairing mounted on the frame. The fairing comprises a molded shell formed to provide a bridge portion having two depending side portions which define with the bridge portion a cavity of generally inverted U-shape and cross section, a hollow front portion extending upwardly and forwardly from the side portions and forwardly from the bridge portion and a rear portion extending rearwardly from the bridge portion.

U.S. Pat. No. Des. 136,565 which issued Oct. 26, 1943 to Snell discloses an ornamental design for a bicycle which includes a complete body casing of a teardrop shape. This design has limited relevancy to the present invention in that it relates only in its attempt to improve the aerodynamics of the bicycle.

U.S. Pat. No. Des. 138,304 issued Jul. 11, 1944 to Boynton discloses an ornamental design for a bicycle which includes a contoured body covering constituting the majority of the bicycle frame. The design does not involve any integration of the front wheel fork and steering means, which is a steering wheel.

As will be clear from the following descriptions and illustrations, the present invention does not provide an attachment to an otherwise complete bicycle. Rather, the present invention is an actual component part of the bicycle and there is effectively no bicycle without the invention. The present invention incorporates and integrates a unitary construction concept providing not only a handlebar portion as well as the front wheel fork portion but also includes a post for attachment to the head tube of the remainder of the bicycle. In the present invention these portions being of a unitary and integral construction have an intermediate portion which bridges between the front wheel fork and the handlebar portions so as to provide a continuous and uninterrupted forward facing surface and the geometry of this surface additionally provides various aerodynamic benefits. However, a primary focus is on the strength, stability and control of the bicycle by means of this integral front wheel fork and handlebar unit.

SUMMARY OF THE INVENTION

A front wheel fork and handlebar unit for attachment to the head tube of a bicycle according to one embodiment of the present invention comprises a handlebar portion for use in steering the bicycle, a front fork portion for attaching to the front wheel of the bicycle, an intermediate portion for directly and integrally joining together the handlebar portion and the front fork portion for transferring steering forces from the handlebar portion to the front fork portion for steering the bicycle and attachment means for receipt by the head tube of the bicycle.

One object of the present invention is to provide an improved front fork and handlebar unit for a bicycle.

Related objects and advantages of the present invention will be apparent from the following description.

DESCRIPTION OF THE PREFERRED EMBODIMENT

Figure 1:
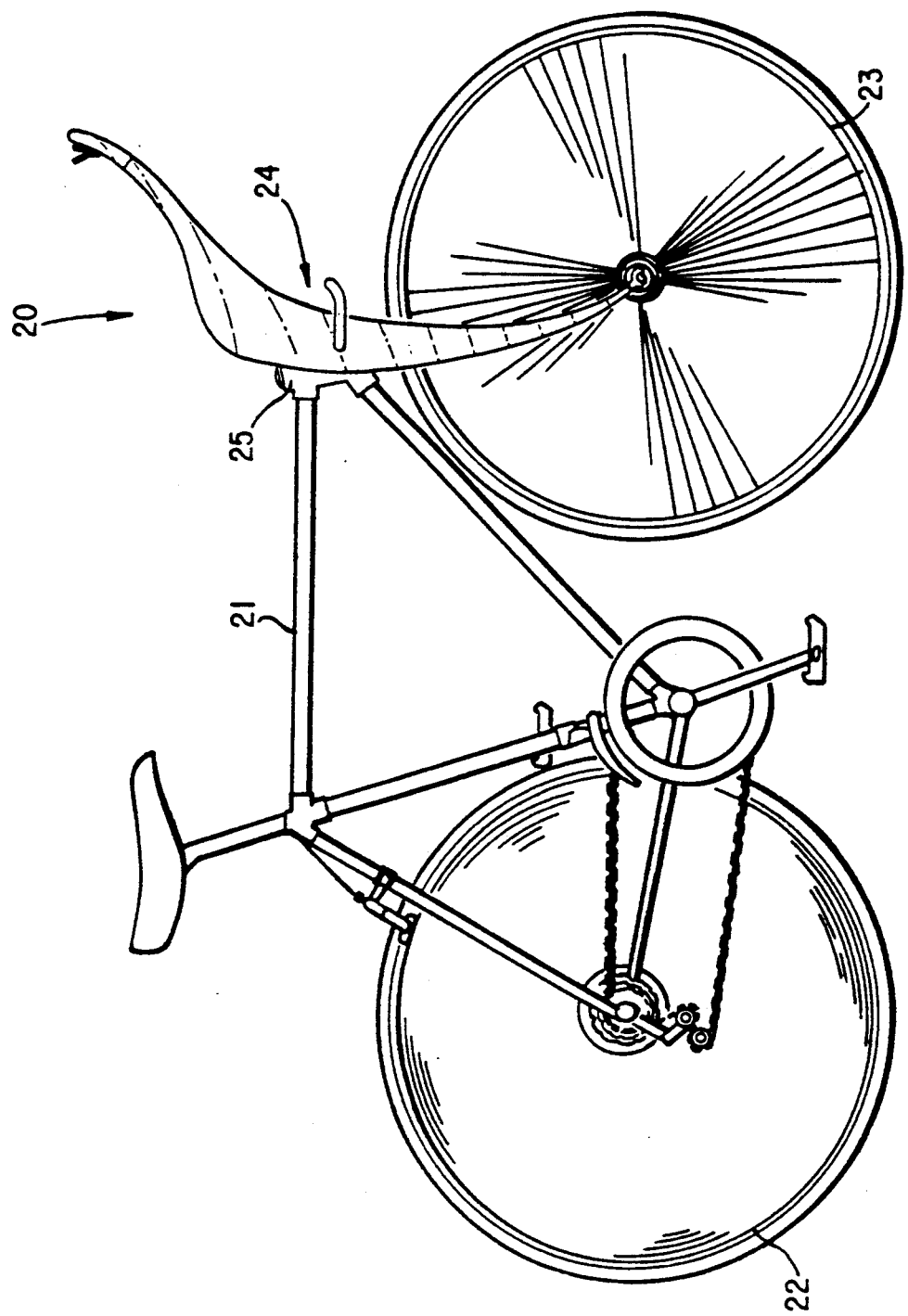
FIG. 1 is a side elevational view of a bicycle with an integral front fork and handlebar unit according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a bicycle 20 which includes a frame 21, rear disk wheel 22, front spoke wheel 23 and integral front fork and handlebar unit 24 which is received by the head tube 25. With the exception of the front fork and handlebar unit 24, the remainder of bicycle 20 is of a typical or conventional construction in all respects including the remainder of the frame, the gear shift mechanism and brakes. As used herein the term "integral" when referring to the front fork and handlebar unit 24 means a single-component, unitary member.

Figure 2A:
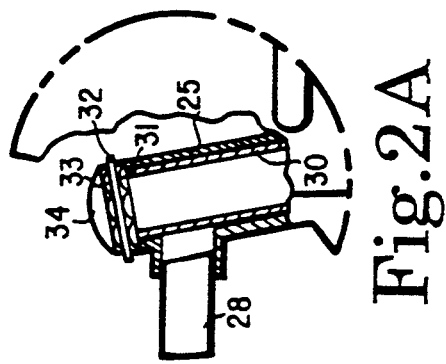
FIG. 2A is a partial, fragmentary side elevational view of the head tube of the bicycle and its attachment to the FIG. 2 front fork and handlebar unit.
Figure 7:
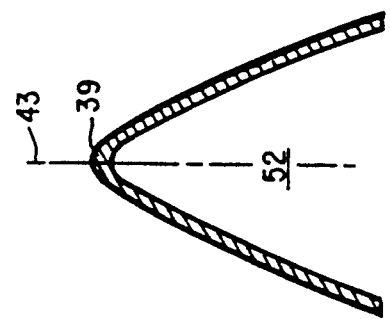
FIG. 7 is a top plan view in full section of the FIG. 2 front fork and handlebar unit as viewed along line 7—7 in FIG. 2.
Figure 2:
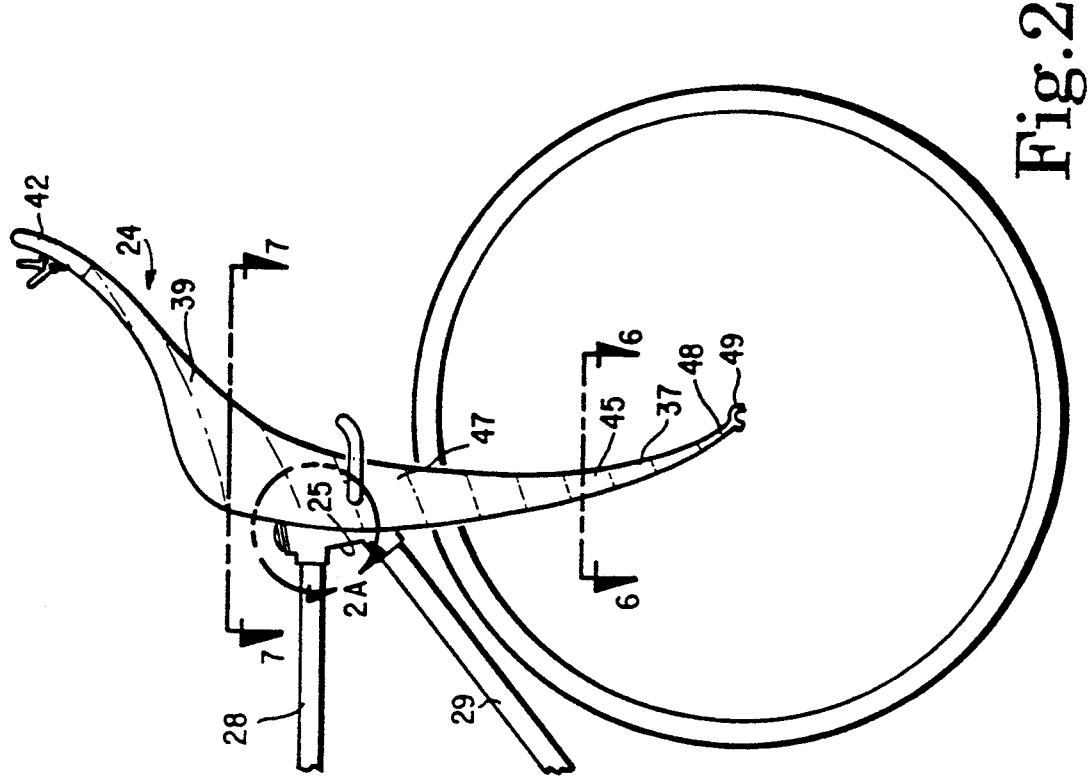
FIG. 2 is a side elevational view of the front fork and handlebar unit of FIG. 1.
Figure 5:
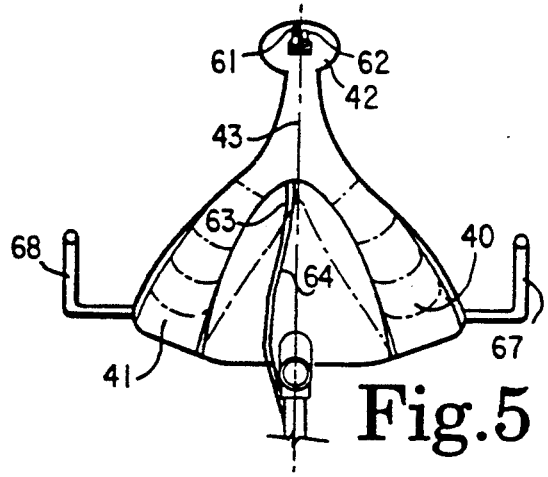
FIG. 5 is a top plan view of the FIG. 2 front fork and handlebar unit.

With reference to FIG. 2, the details of the front fork and handlebar unit are illustrated. Only a portion of the bicycle frame 21 is illustrated in this figure and the front wheel is only diagrammatically illustrated. The wheel spokes, tire, axle and axle hardware are omitted simply for drawing clarity. These items do not relate to an understanding of the present invention except to realize that unit 24 attaches to the front wheel axle in the typical or conventional fashion with the typical axle hardware.

Frame members 28 and 29 are rigidly attached to head tube 25 which is a hollow cylindrical receiving sleeve for the front fork post 30 of unit 24. In FIG. 2A the attachment of the front fork post 30 is illustrated and includes the stack of a hex nut 31, flat washer 32, hex nut 33 and plug 34. This assembly is conventional in all respects such that the front fork post 30 is held axially in position but allowed to rotate freely for steering the bicycle by turning of the front wheel in response to movement of the handlebar portion. The turning or steering forces begin with the upper handlebar portion of the bicycle and are transmitted both through unit 24 and through post 30 as it is received by the head tube 25 to the front fork portion of unit 24.

Referring to FIGS. 2, 3, 4, and 5 the details of the front fork and handlebar unit 24 are illustrated. Unit 24 includes front fork post 30, front wheel support arms 37 and 38, wedge-shaped protruding front portion 39, concave forearm channels 40 and 41 and handhold disk 42. The forearm channels 40 and 41 are side-by-side and forwardly converge toward handhold disk 42. Unit 24 is integral and the arms 37 and 38, portion 39, channels 40 and 41, and disk 42 are fabricated as a unitary component out of a carbon composite construction material. Front fork post 30 is a generally cylindrical tube which is received by the head tube 25 as previously described. Post 30 extends in an upright direction from the top of the front wheel support arms and the post is aligned with the vertical plane of the front wheel. The cylindrical axis of post 30 is disposed on the centerline of unit 24 and unit 24 is symmetrical about centerline 43.

Figure 6:
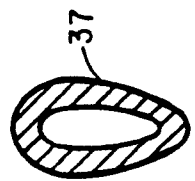
FIG. 6 is a top plan view in full section of one front wheel support of the FIG. 2 front fork portion as viewed along line 6—6 in FIG. 2.

The front wheel support arms 37 and 38 curve outwardly in a forward direction as they extend downwardly from the general location of the front fork post 30. These two arms are hollow and have a teardrop shape in the lateral cross section as shown in FIG. 6 which is a top plan section view taken along line 6—6 in FIG. 2 looking in the direction of the arrows. The wall thickness of each hollow support arm is approximately ⅛ of an inch. The forward facing surfaces 45 and 46 of arms 37 and 38 are concave in the side elevational view and smoothly taper from a wider upper portion 47 to a smaller lower portion 48 which terminates at the wheel axle sleeve 49.

The protruding front portion 39 is positioned between the upper portions 47 of the wheel support arms 37 and 38 and disk 42 and in between the two forearm channels 40 and 41. The generally concave shape (side elevational view) of the wheel support arms is continued by front portion 39 with a smooth, continuous curve as shown in the side elevational view of FIG. 2. Only at the upper end where portion 39 blends into the handhold disk 42 does this side elevational view curvature become convex. Front portion 39 is a wedge shape, forwardly protruding portion (top plan view) which creates an open area 52 which is shielded from the wind. This open area 52 which extends from below the forearm channels 40 and 41 to the top of the front wheel support arms 37 and 38 provides a protected area for food and drink items, small articles of clothing or bicycle accessories. The entire front portion of unit 24 is continuous and interrupted except for where the front fork splits into the two front wheel support arms 37 and 38 which go to opposite sides of front wheel 23. This continuous and uninterrupted nature of unit 24 and the forwardly protruding portion 39 create a desirable aerodynamically efficient design which is incorporated into essential structural components of the bicycle. It should be noted that by conventional configuring and positioning of the wheel support arms 37 and 38 and post 30, the present design is generally adaptable to any bicycle as an essential component of that assembled bicycle.

Unit 24 can be though of as generally having three portions. There is a first portion or first means for controlling the steering of the bicycle, similar to the function and purpose of the handlebars of conventional bicycles. This handlebar portion generally includes the forearm channels 40 and 41 and the handhold portion or disk 42. There is a second portion or second means for attaching to the front wheel of the bicycle, similar to the function and purpose of the front wheel fork of conventional bicycles. This front wheel fork portion generally includes wheel support arms 37 and 38. As illustrated, there is an intermediate portion which can be thought of including the protruding front portion 39 as well as including the remainder of unit 24 from just below channels 40 and 41 down to the top of support arms 37 and 38 which location generally coincides with the top of the front wheel.

Figure 3:
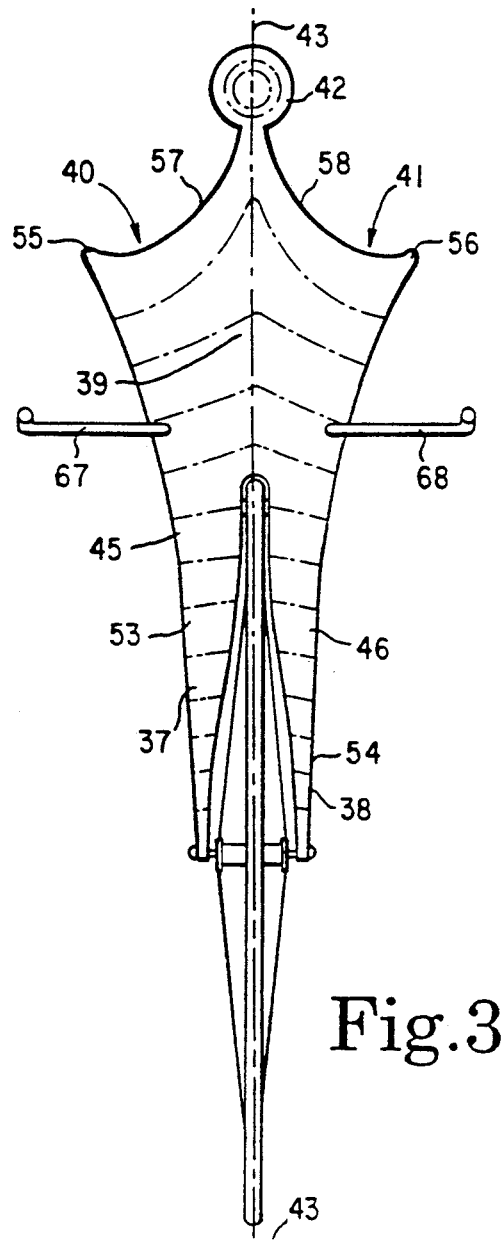
FIG. 3 is a front elevational view of the FIG. 2 front fork and handlebar unit.
Figure 4:
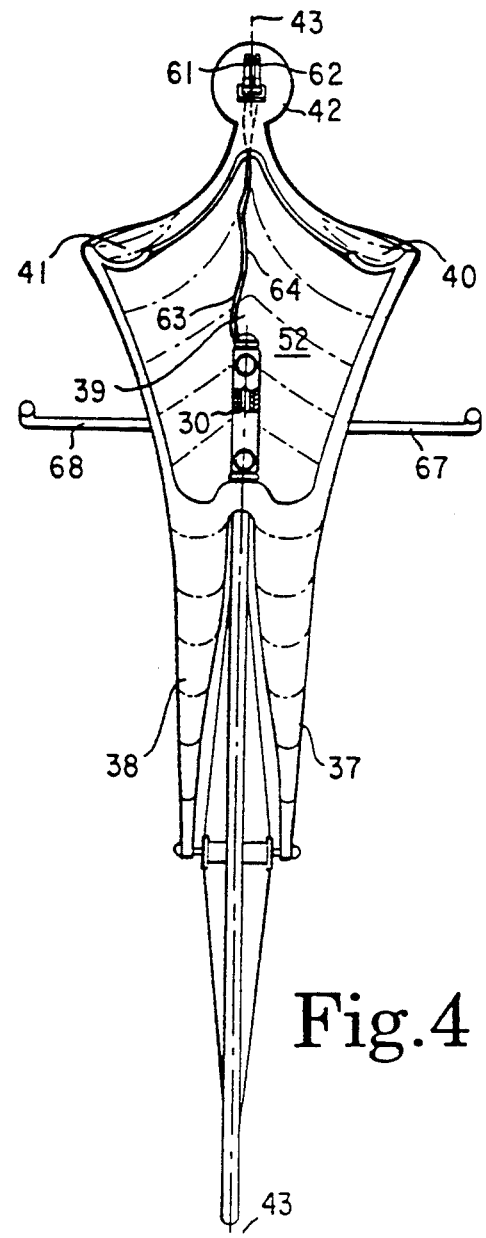
FIG. 4 is a rear elevational view of the FIG. 2 front fork and handlebar unit.

Other geometric shapes and contours which are part of the integral front fork and handlebar unit 24 include the downwardly converging sides 53 and 54 of front wheel support arm 37 and 38 (see FIGS. 3 and 4). These sides 53 and 54 diverge in an upward direction (front elevational view) ending at the outer edges (corners) 55 and 56 of the forearm support channels 40 and 41, respectively. The top, forward edges 57 and 58 of the forearm channels have a concave shape as they converge upwardly (see FIG. 4) and inwardly (see FIG. 5) before terminating at the handhold disk 42. As should be understood, the rider places his forearms in the forearm channels and grasps onto the handhold disk 42 as he leans forward in a normal cycling orientation. It is in this position that the rider actually uses both the forearm channels and the handhold disk as the means for steering the bicycle and while these portions are not handlebars in the traditional sense of a pleasure bicycle, this portion is referred to as the handlebar portion for the purposes of the description of the present invention. To the extent that the handlebar portion of a conventional pleasure bicycle is held by the rider and used for steering, then the handhold disk as well as the forearm channels are also held and manipulated by the rider for steering in the present invention.

The gearshift levers 61 and 62 are mounted to the handhold disk 42 and corresponding cables 63 and 64 are illustrated. It is to be understood that these gearshift levers operate in a manner typical of multi-speed bicycles and that the cables are connected as well in the normal fashion. Also included, though not illustrated as part of bicycle 20, are hand brakes for the front and rear wheels. These hand brakes while present as part of the bicycle have been omitted for drawing clarity and as would be understood, the hand brakes include front hand levers, connecting cables and brake calipers which are designed and arranged to apply a braking force to both the front and rear wheels in the normal or typical fashion.

Auxiliary handlebars 67 and 68 are secured to or anchored in the front fork and handlebar unit 24. These auxiliary handlebars extend outwardly in a substantially horizontal fashion and are used by the cyclist when maneuvering up a hill climb or at the time of power acceleration where the rider may actually be standing up as opposed to sitting. These handlebars are used to provide greater stability and balance when the cyclist is in an upright stance and body weight is shifting from side to side.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A unitary front fork and handlebar member for attachment to a head tube of a bicycle, said member comprises:
   a handlebar portion for use in steering said bicycle, said handlebar portion including a pair of forearm supports and a handhold portion;
   a front fork portion for attaching to and supporting a front wheel for said bicycle;
   an intermediate portion extending between said handlebar portion and said front fork portion; and
   attachment means for receipt by the head tube of said bicycle.

2. The unitary front fork and handlebar member of claim 1 wherein said attachment means includes a generally cylindrical post.

3. The unitary front fork and handlebar member of claim 2 wherein said front fork portion includes a pair of front wheel support arms.

4. The unitary front fork and handlebar member of claim 3 wherein said generally cylindrical post is disposed in a vertical plane which separates said pair of front wheel support arms.

5. The unitary front fork and handlebar member of claim 1 wherein said front fork portion includes a pair of front wheel support arms.

6. The unitary front fork and handlebar member of claim 1 wherein said member is fabricated from a carbon composite construction material.

7. A unitary front fork and handlebar member for attachment to a head tube of a bicycle, said member comprises:
   first means for initiating steering of said bicycle, wherein said first means includes a pair of forearm supports and a handhold member;
   second means for supporting and turning a front wheel of said bicycle, said second means being adapted for attachment to the axle of said front wheel;
   an intermediate portion extending between said first means and said second means; and
   attachment means for inserting into the head tube of said bicycle in order to support said member and complete the bicycle construction.

8. The unitary front fork and handlebar member of claim 7 wherein said second means includes a front fork for attaching to the front wheel of said bicycle.

9. The unitary front fork and handlebar member of claim 8 wherein said front fork includes a pair of wheel support arms.

10. The unitary front fork and handlebar member of claim 7 wherein said attachment means includes a generally cylindrical post.

11. A unitary front fork and handlebar member for attachment to a head tube of a bicycle, said member comprises:
    first means for initiating steering of said bicycle, wherein said first means includes a pair of forearm supports and a handhold member;
    second means for supporting and turning a front wheel of said bicycle, said second means being adapted for attachment to the axle of said front wheel;
    an intermediate portion extending between said first means and said second means, wherein said intermediate portion has a forward protruding wedge shape; and
    attachment means for inserting into the head tube of said bicycle in order to support said member and complete the bicycle construction.

12. A unitary front fork and handlebar unit for attachment to a head tube of a bicycle, said unit comprises:
    a handlebar portion for use in steering said bicycle includes a pair of forearm supports and a handhold portion, said forearm supports each being concave channels that converge into said handhold portion;
    a front fork portion for attaching to a front wheel for said bicycle;
    an intermediate portion extending between said handlebar portion and said front fork portion; and
    attachment means for attachment to the head tube of said bicycle.

13. A unitary front fork and handlebar unit for attaching to a head tube of a bicycle, said unit comprises:
    first means for steering said bicycle, said first means including a pair of forearm supports and a handhold member, said forearm supports each being a concave channel that converges into said handhold member;
    second means for supporting and attaching to a front wheel for said bicycle;
    an intermediate portion extending between said first means and said second means; and
    attachment means for inserting into the head tube of said bicycle in order to support said unit and complete the bicycle construction.

14. A unitary front fork and handlebar member for attachment to a head tube of a bicycle, said member comprises:
    a handlebar portion for use in steering said bicycle, said handlebar portion including a pair of forwardly extending, side-by-side forearm supports and a handhold portion, said forearm supports converging toward said handhold portion;
    a front fork portion for supporting and attaching to a front wheel for said bicycle;
    an intermediate portion extending between said handlebar portion and said front fork portion; and
    attachment means for attachment to the head tube of said bicycle.

* * * * *